UNITED STATES PATENT OFFICE.

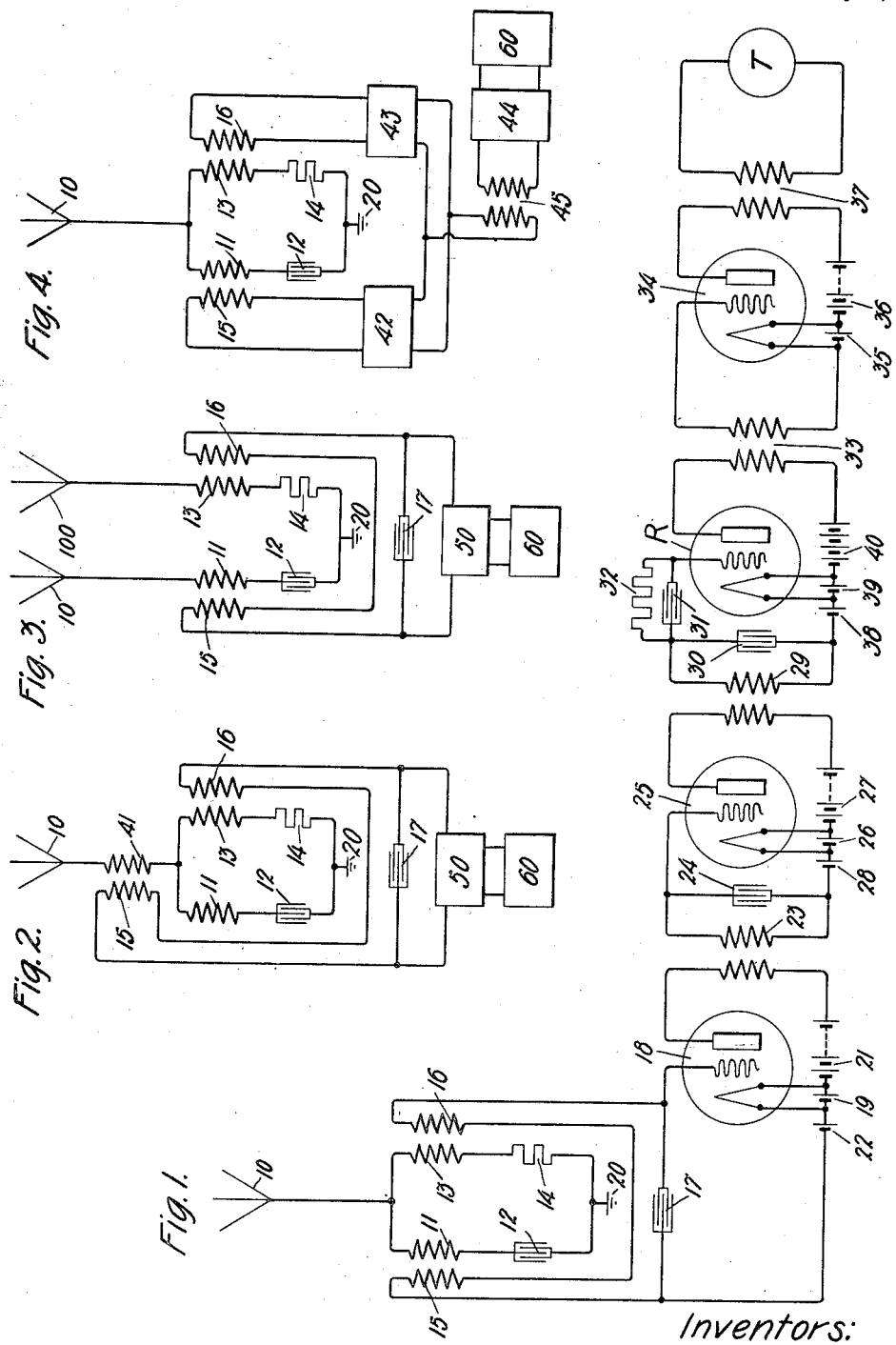

HAROLD DE FOREST ARNOLD, OF EAST ORANGE, AND HAROLD WILLIAM NICHOLS, OF MAPLEWOOD, NEW JERSEY, ASSIGNORS, BY MESNE ASSIGNMENTS, TO WESTERN ELECTRIC COMPANY, INCORPORATED, A CORPORATION OF NEW YORK.

RADIOTRANSMISSION.

1,231,984.

Specification of Letters Patent. Patented July 3, 1917.

Application filed August 30, 1915. Serial No. 47,996.

*To all whom it may concern:*

Be it known that we, HAROLD DE FOREST ARNOLD and HAROLD WILLIAM NICHOLS, citizens of the United States, residing at East Orange and Maplewood, in the county of Essex and State of New Jersey, respectively, have invented certain new and useful Improvements in Radio Transmission, of which the following is a full, clear, concise, and exact description.

This invention relates to interference prevention in wireless signaling.

The object of this invention is to attain high selectivity, high efficiency and prevention of interference in wireless signaling. This object is attained by using tuned and untuned circuits so arranged that they are acted upon equally or approximately equally by transient disturbances and unequally by sustained waves of the desired frequency, and further arranged so that the effects of the transient disturbances neutralize each other. The invention is particularly adapted for use in wireless telephony, but, obviously, may be used equally well in wireless telegraphy or in any system of signaling in which tuned circuits are used to receive signals of an oscillatory character.

It has been proposed to obtain high selectivity by using a plurality of resonant circuits in series formation between the receiving antenna and the translating device. When these circuits are tuned to the frequency of the waves to be received and are loosely coupled, a high degree of selectivity is obtained, but the energy of the received signals decreases with the increase in the number of resonant circuits and the decrease in the closeness of coupling.

Furthermore, when a heavy disturbance of an impulsive character, such as static disturbances, strikes the antenna, the sharp tuning of the resonant circuits does not prevent the introduction of an unduly large amount of energy. Under such an impressed electromotive force, the initial rush of current which flows is inversely proportional to the inductance, and practically independent of the period or the resistance of the circuit. In the case of sustained oscillations in a tuned circuit, however, the final current is dependent on the resistance, being inversely proportional thereto. This fact affords a means for discriminating between sustained waves and disturbing transient waves. If, for example, two parallel circuits have impressed on them an electric impulse, the initial rush of current in each will be inversely proportional to the inductances. Furthermore, if the inductances are made equal, the currents will be equal and may be caused to annul each other's effect in an inductively connected circuit. The above condition will hold, although the resistance and capacity in the two parallel circuits are widely different.

If, however, the impressed electromotive force is of a sustained oscillatory character, the current, which will finally be built up, will depend on all the constants of the circuit, and, in case of a tuned circuit, will depend upon the resistance, being inversely proportional thereto. If the one circuit is tuned to the frequency of the received electromotive force and has a low resistance, while the other circuit has an equal inductance but a high resistance, the current flowing in the first circuit will be much larger than in the second.

This may be more briefly expressed by using the well-known term "damping constant." If a transient impulse acts on two circuits with the same inductance but different damping constants, the current produced will be the same in both, but if sustained oscillations act on the two circuits, the current will be larger in the circuit with the lower damping constant. In order then to obtain discrimination between impulsive electromotive forces and sustained oscillations, it is necessary to give the one circuit a large damping constant. This is most easily accomplished by increasing the resistance or decreasing the inductance.

By using a third circuit inductively connected to both of the primary circuits, the effect of the impulse may be neutralized, but the effect of the sustained oscillations will be transferred to the translating device. Since, in all cases where discrimination is obtained, there must be some loss of energy, it will, in general, be necessary to amplify the desired high frequency oscillations, after which they may be detected.

In addition to preventing interference from impulsive or static disturbances, it is desirable to prevent interference from sustained oscillations of an undesired frequency. This is largely accomplished by tuning the one branch of the antenna circuit. Elimination may, however, be carried farther, by the use of a plurality of resonant circuits loosely coupled in series formation and tuned to the desired frequency. However, as mentioned previously, this entails a large loss in energy. It is, therefore, necessary to use amplifiers to make up for this loss in energy. Furthermore, in order to prevent undesirable interaction between the circuits and to permit closer coupling, with an attendant increase in efficiency, it has been found desirable to use unilateral amplifiers of the thermionic or audion type.

In connection with this specification, reference is to be had to the accompanying drawings in which Figure 1 is a diagrammatic view of the arrangement of the apparatus at a receiving station; Fig. 2 shows a modification of this arrangement; Fig. 3 shows a further modification in which two antennæ are used; Fig. 4 shows still a further modification.

Referring to Fig. 1, 10 represents an elevated conductor or other antenna arrangement suitable for the reception of radio signals. Between this antenna and the earth connection 20 is connected a branched circuit, one branch thereof containing the inductance 11 and capacity 12, whereby this branch may be tuned to the frequency of the waves which are to be received. The other branch contains the inductance 13 and resistance 14. This resistance 14 is, in general, large, in order that the damping constant, R/L, of this branch shall be large compared to that of the first branch. The two branches are connected to earth at 20.

A circuit is inductively and adjustably connected by means of inductances 15 and 16 to inductances 11 and 13 respectively. This circuit contains a condenser 17, and is adapted to be tuned to the signaling frequency. Shunted around the condenser 17 is a circuit leading to the translating device. This circuit contains a unilateral thermionic amplifier 18 of the audion type with the usual batteries 19 and 21. In addition, it is advisable to connect a battery 22 in the input circuit, as shown, in order to bring the grid of the amplifier to a negative potential with respect to the heated filament. The output circuit of this amplifier is inductively connected to the circuit tuned to the frequency of the signals to be received. This circuit in turn becomes the input circuit of the amplifier 25, which contains the batteries 26, 27 and 28 for the same purpose as described in connection with 18. The output circuit of 25 is inductively connected to a tuned circuit 29, 30, which is connected with the condenser 31 and becomes the input circuit of a detector R. This detector may be of any well-known type, but it has been found that a thermionic rectifier of the audion type is very satisfactory.

The condenser 31 is shunted by a high leakage resistance 32, for the purpose well known in the art, and as fully described in application of Arnold Serial No. 48,873, filed September 3, 1915. The low frequency output circuit of the rectifier R is inductively connected, by means of the transformer 33, to the amplifier 34 with its batteries 35, 36. Having been so amplified, the energy is transferred by means of the transformer 37 to the telephone receiver T or other translating device.

It is obvious that many variations and modifications to this last circuit may be made without departing from the spirit of this invention. For example, the last amplifying circuit may be omitted or may be reinforced by other amplifying circuits. Also, the number of amplifying circuits between the condenser 17 and the detector R may be varied to suit conditions. In the last named amplifying and weeding out or selective circuits, the batteries 22, 28 and 38 may be omitted.

If sustained waves of desired frequency are impressed on the antenna of the receiving station above described, the current in the tuned branch 11, 12 is large, while that in the branch 13, 14 is very small. Energy is thus transferred to the circuit 15, 17, 16, and from there to the translating device. If, on the other hand, static or impulsive disturbances are impressed on the antenna, the current in the two branches will neutralize each other's effect in the circuit 15, 17, 16. In general inductances 11 and 13 will be made approximately equal in order that the currents will be equal, but this is by no means necessary, for any difference in 11 and 13, causing a difference in the currents, will be compensated for by changing the coupling, or inductive relation, between 11 and 15, or between 13 and 16. In practice, such a change in coupling is arranged for and is made until the effect of disturbances is reduced to a minimum.

In the modification shown in Fig. 2, the inductance 15 is connected inductively to the inductance 41, which is connected directly to the antenna and is, therefore, common to both of the branches of the divided circuit. As in Fig. 1, the inductance 16 is inductively connected to 13. In this case all of the energy received on the antenna is effective upon 15, and the disturbances are neutralized by proper choice of the dimensions of the inductances and of the coupling, or inductive relationship between them. 50 and 60 represent the system of amplifying, selecting, detecting and translating circuits shown and described in connection with Fig. 1.

Two antennæ for receiving may be used instead of a single antenna, and such a modification is shown in Fig. 3. Connected to the antenna 10 are the inductance 11 and capacity 12, whereby this antenna is tuned to the frequency of the desired signals. The antenna 100 is connected to the inductance 13 and the resistance 14, which function in the same manner and for the same purpose as described in Figs. 1 and 2. The two antennæ may be grounded separately or brought together to a common ground, as shown at 20. Inductively connected to 11 and 13 is the circuit 15, 17, 16, with its connected circuits 50 and 60, the whole functioning in the same manner and for the purpose already described.

Fig. 4 shows a modification in which amplifiers 42 and 43 are connected directly in the circuit 15, 16. Directly across this circuit is shunted the primary of the oscillation transformer 45, the secondary of which is connected to a further system, 44 and 60, of amplifying, selecting, detecting, and translating circuits, all as described in connection with Fig. 1.

What is claimed is:

1. A system for receiving electromagnetic waves of a definite frequency comprising an antenna; a divided circuit associated therewith, the branches of said circuit having widely different damping constants, and a receiving circuit associated with said branches in such a manner that the effects of the branches oppose each other in the receiving circuit.

2. A system for receiving electromagnetic waves of a definite frequency comprising an antenna; a divided circuit associated therewith, the branches of said circuit having widely different damping constants, and receiving apparatus associated with the divided circuit, said receiving apparatus including means for amplifying the effects of the sustained waves.

3. A system for receiving electromagnetic waves of a definite frequency comprising an antenna; a divided circuit associated therewith, one branch of said circuit containing a relatively large resistance whereby the circuit is caused to discriminate between sustained waves and transient waves, and receiving apparatus associated with the divided circuit.

4. A system for receiving electromagnetic waves of a definite frequency comprising an antenna; a divided circuit associated therewith, one branch of said circuit being tuned to the frequency of the received waves, another branch containing a comparatively large resistance to render the system selectively receptive to sustained oscillations, and receiving apparatus associated with the divided circuit.

5. A system for receiving electromagnetic waves of a definite frequency comprising an antenna; a divided circuit associated therewith, one branch of said circuit being tuned to the frequency of the received waves, another branch containing a comparatively large resistance to render the system selectively receptive to sustained oscillations; a circuit inductively connected to both branches; means connected with said circuit for amplifying received signals, and a translating device for said signals.

6. A system for receiving electromagnetic waves of a definite frequency comprising an antenna; a divided circuit associated therewith, one branch of said circuit being tuned to the frequency of the received waves, another branch containing a comparatively large resistance to render the system selectively receptive to sustained oscillations; a circuit inductively connected to both branches; a unilateral tuned circuit coupled to said circuit; an amplifier and a receiver for the received signals.

7. In a system for wireless telephony; an antenna, a divided circuit associated therewith; an inductance and a capacity in one branch thereof for tuning the said branch to the desired frequency; an inductance and resistance in the other branch to render the damping constants of the branches widely different; a tuned circuit inductively connected to both branches; a unilateral tuned circuit coupled to said circuit; an amplifier and a receiver for the received signals.

8. In a system for wireless telephony; an antenna; a divided circuit associated therewith; an inductance and capacity in one branch thereof for tuning the said branch to the desired frequency, the other branch containing a resistance to render the damping constants of the branches widely different; a tuned circuit inductively connected to both branches; a unilateral tuned circuit coupled to said circuit; an amplifier and a receiver for the received signals.

9. In a system for wireless telephony; an antenna; a divided circuit associated therewith; an inductance and capacity in one branch thereof for tuning the said branch to the desired frequency; an inductance and resistance in the other branch to render the damping constants of the branches widely different; a tuned circuit inductively connected to both branches; a unilateral tuned circuit coupled to said circuit and containing a thermionic amplifier; a circuit coupled to the last named circuit and containing a thermionic detector and a telephone receiver associated therewith.

10. In a system for wireless telephony; an antenna; a divided circuit associated therewith; an inductance and capacity in one branch thereof for tuning the said branch to the desired frequency; an inductance and resistance in the other branch to render the damping constants of the branches widely different; a tuned circuit inductively connected to both branches; a plurality of unilateral tuned circuits, arranged in series formation, coupled to said circuit; an amplifier and a receiver for the received signals.

11. In a system for wireless telephony; an antenna; a divided circuit associated therewith; an inductance and capacity in one branch thereof for tuning the said branch to the desired frequency; an inductance and resistance in the other branch to render the damping constants of the branches widely different, a tuned circuit inductively connected to both branches, a plurality of unilateral tuned circuits, arranged in series formation, coupled to said circuit, each unilateral circuit containing a thermionic amplifier; a circuit containing a thermionic detector coupled to the last of the series of unilateral circuits; a circuit connected to the rectifying circuit and containing a thermionic amplifier and a telephone receiver connected to the last named amplifying circuit.

In witness whereof, we hereunto subscribe our names this 26 day of August A. D., 1915.

HAROLD DE FOREST ARNOLD.
HAROLD WILLIAM NICHOLS.